United States Patent [19]
Sumi et al.

[11] Patent Number: 5,134,327
[45] Date of Patent: Jul. 28, 1992

[54] RESIN-MOLDED MOTOR AND A METHOD FOR ITS MANUFACTURE

[75] Inventors: Masatomo Sumi; Shigeo Inaki, both of Takefu; Yutaka Takamiya, Osaka; Genki Kondo, Takefu, all of Japan

[73] Assignee: Matsushita Electric Industrial Co., Ltd., Osaka, Japan

[21] Appl. No.: 406,356

[22] Filed: Sep. 12, 1989

[30] Foreign Application Priority Data

Sep. 14, 1988 [JP] Japan .................. 63-230446

[51] Int. Cl.$^5$ .................. H02K 1/04; H02K 15/02; H02K 1/12; H02K 15/10
[52] U.S. Cl. .................. 310/43; 310/42; 310/216
[58] Field of Search .................. 310/42, 43, 45, 180, 310/216, 217, 218, 254, 258, 89, 86

[56] References Cited

U.S. PATENT DOCUMENTS

| | | | |
|---|---|---|---|
| 2,323,114 | 6/1943 | Bradford | 310/218 |
| 2,354,551 | 7/1944 | Sawyer | 310/216 |
| 2,547,599 | 4/1951 | Roters | 310/258 |
| 2,607,816 | 8/1952 | Ryder et al. | 310/42 |
| 2,695,969 | 11/1954 | Yates | 310/259 |
| 2,711,008 | 6/1955 | Smith | 310/216 |
| 2,871,384 | 1/1959 | Gabriel | 310/258 |
| 3,701,911 | 10/1972 | Hallerback | 310/90 |
| 3,792,299 | 2/1974 | Hallerback | 310/258 |
| 3,979,822 | 9/1976 | Halm | 310/89 |
| 4,015,154 | 3/1977 | Tanaka et al. | 310/42 |
| 4,149,309 | 4/1979 | Mitsui | 310/218 |
| 4,600,864 | 7/1986 | Sato | 310/216 |
| 4,823,032 | 4/1989 | Ward et al. | 310/43 |
| 4,882,510 | 11/1989 | Newberg | 310/63 |

FOREIGN PATENT DOCUMENTS

| | | | |
|---|---|---|---|
| 562548 | 5/1957 | Italy | |
| 52-79207 | 7/1977 | Japan | |
| 53-39407 | 4/1978 | Japan | |
| 5504 | 1/1979 | Japan | 310/43 |
| 13650 | 1/1980 | Japan | 310/45 |
| 83451 | 6/1980 | Japan | 310/49 R |
| 213249 | 10/1985 | Japan | 310/45 |
| 213250 | 10/1985 | Japan | 310/45 |
| 213251 | 10/1985 | Japan | 310/45 |
| 126942 | 6/1959 | U.S.S.R. | |

Primary Examiner—Steven L. Stephan
Assistant Examiner—C. LaBalle
Attorney, Agent, or Firm—Wenderoth, Lind & Ponack

[57] ABSTRACT

A resin-molded motor constituted by a rotor, a laminated stator having generally axially and radially extending slots defining pole pieces therebetween and resin material molded in the inner portions of the slots and over the inner ends of the slots for insulation and bonding of the laminated stator, a generally cylindrical resin material shroud at each end of the stator extending from the corresponding axial end face at the inner peripheral portion thereof and extending axially of the motor, a steel sheet bracket on the axially outer end of each of the shrouds and having journal means therein supporting the rotor, a plurality of windings around the pole pieces of the stator and having axially outer coil ends against the shrouds, a connector having connector terminals to which conductor ends of the windings are connected for supplying power to the windings, and a housing of resin material molded around the stator, the windings, the shrouds, the brackets and the connector with the terminals exposed from the housing.

5 Claims, 6 Drawing Sheets

RESIN-MOLDED MOTOR AND A METHOD FOR ITS MANUFACTURE

BACKGROUND OF THE INVENTION

The present invention relates generally to a resin-molded motor and a method of manufacturing it.

A resin-molded motor, such as a compact induction motor commonly used in a home washing machine, comprises a resin-insulated core winding, a stator with a winding, and a rotor accommodated in a resin housing. In the conventional resin-molded motor, as disclosed in Japanese laid-open patent application 79207/1977, a non-magnetic cylindrical member is disposed at each end of a magnetic pole member of the stator and said magnetic pole member and a yoke member are spray-coated with a resin composition to insulate the winding portion of the stator and, at the same time, to secure said cylindrical member to the end face of the stator. After the winding is formed, the whole assembly is covered with a molded resin, i.e. resin-molded, housing.

As described in the above patent literature, the cylindrical member of non-magnetic material which is disposed at each end is intended to prevent the coil end of the winding from passing across the core center and to prevent inflow of the molding resin composition into the rotor segment and the resin coating is intended to bond the members into an integral unit, insulate the stator and secure the punched-out stator members in position.

However, since the cylindrical member has the same inner diameter as said stator members so as to permit insertion of the rotor, the coil end tends to expand outwardly where the primary coil overlaps with the secondary coil so that the ineffective part of the coil is increased to cause such problems as increased electric resistance, increased coil requirements and increased weight. Moreover, unless the outer diameter of the magnetic pole member of the stator is increased, the yoke member cannot be inserted into the magnetic pole member so that the overall size and weight has to be increased.

Furthermore, although the individual stamped-out core members laminated and bonded have been secured in position at the slots by the resin coating, the magnetic pole portions along the inner circumference facing the rotor are interconnected in the form of a ring and, therefore, not secured by the resin coating, with the result that the overall mechanical strength is not sufficient and the resin may crack and cause an insulation failure. Moreover, because of the bridging of magnetic poles, the electrical characteristics of the motor are also unsatisfactory.

It is therefore the object of the present invention to provide a resin-molded motor having improved characteristics and reduced bulk which have been achieved by improvements in the construction of the stator and cylindrical member.

SUMMARY OF THE INVENTION

A resin-molded motor according to the invention comprises a rotor and a laminated stator with the slots, inner edges and ends thereof resin-molded for insulation and bonding, a generally cylindrical resin shroud disposed at each end of said stator, a sheet steel bracket having journal means for supporting a bearing for a rotor, windings around said stator, the coil ends of said windings being connected to connector terminals, and a frame covering said stator, windings, shroud and bracket and molded together with said connector by a synthetic resin composition.

DETAILED DESCRIPTION OF THE PREFERRED EMBODIMENT

A preferred embodiment of the invention is described in detail hereinafter, reference being made to the accompanying drawings.

Figure 2A:
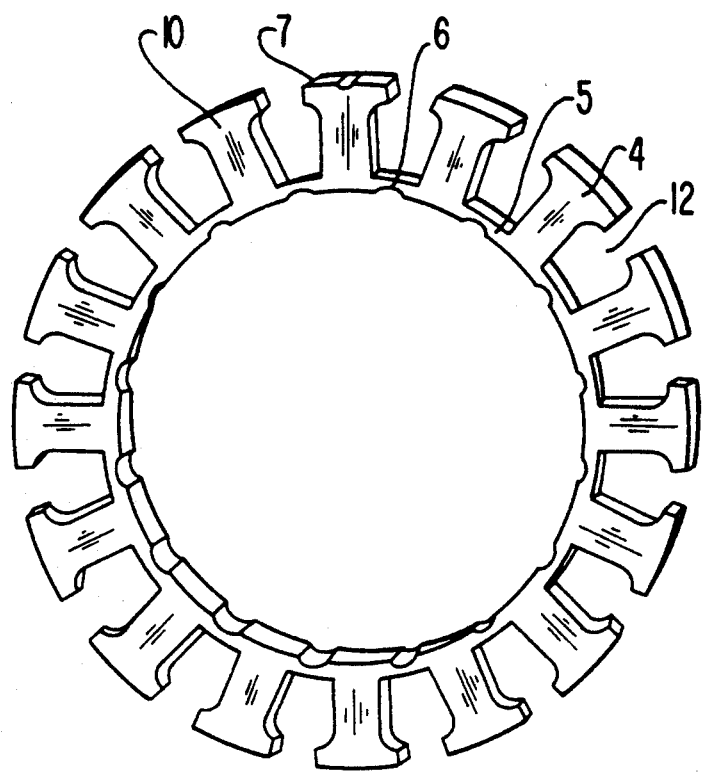
FIGS. 2(a) and 2(b) are perspective views showing the construction of magnetic pole members.
Figure 2B:
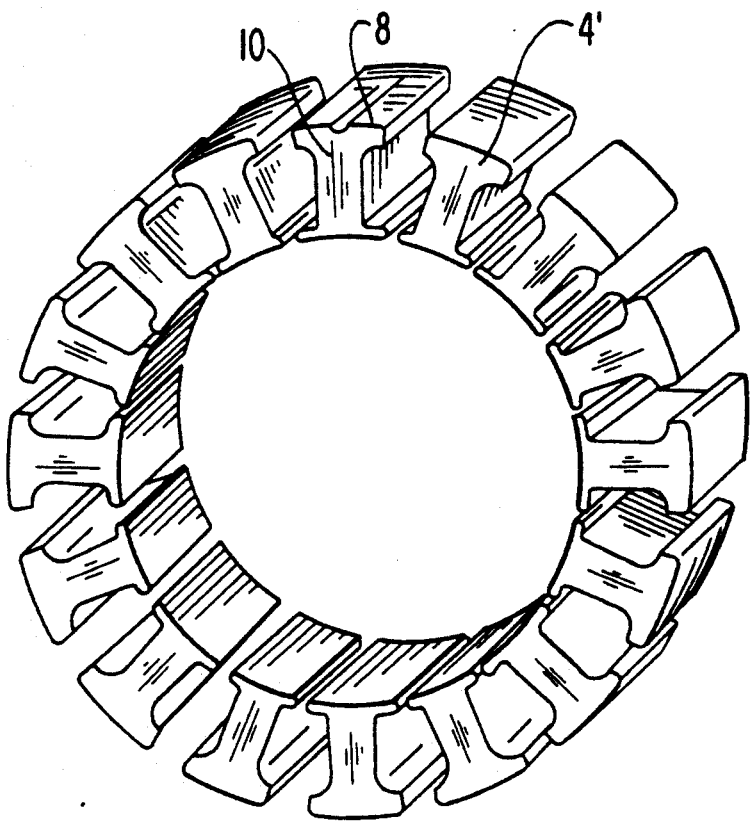

The stator of the resin-molded motor of the invention comprises an externally disposed yoke member 2 and an internally disposed magnetic pole member 3. As illustrated in FIG. 2(a), the magnetic pole member 3 comprises one to three units 7 stamped from a core sheet and each comprising a plurality of magnetic poles 4 interconnected at the inner ends thereof by connections 5 to form a ring with recesses 6 formed along the inner circumference of the ring at positions corresponding to the respective connections. On the other hand, an assembly 8 of core sheets into independent magnetic poles 4' as shown in FIG. 2(b) is provided each having the same thickness as a rotor 9 and disposed in alignment with the magnetic poles 4 and the opposite ends of poles 4' are secured to poles 4 by means of half-punched out fitting grooves 10.

Figure 3:
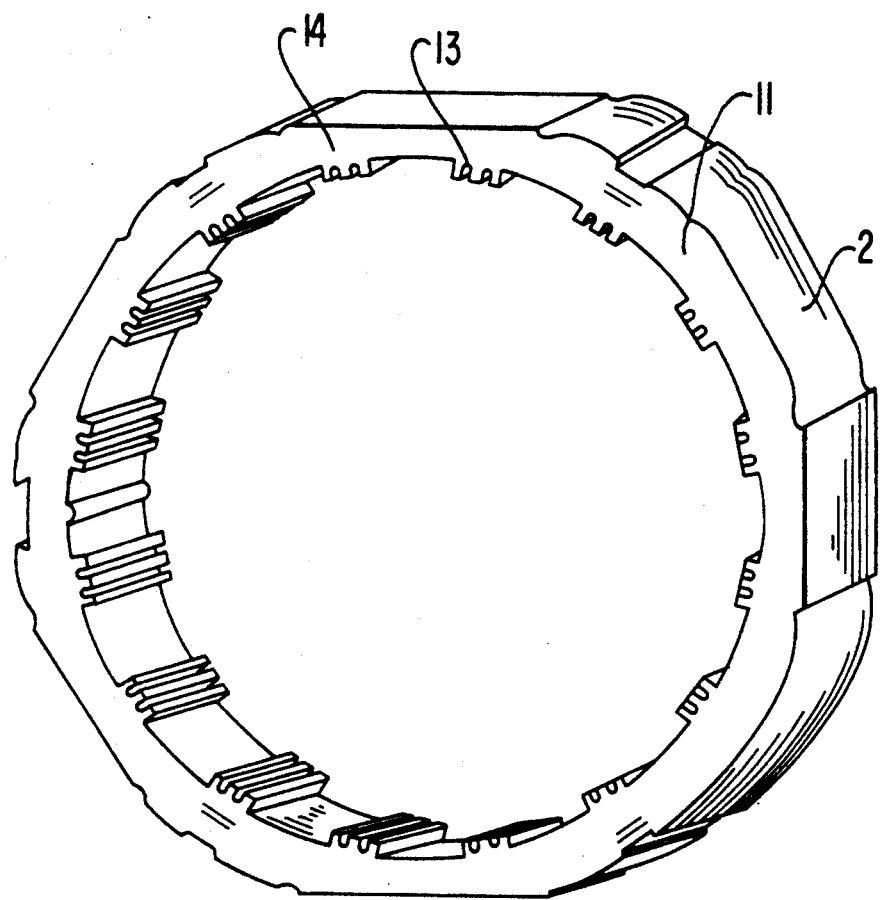
FIG. 3 is a perspective view showing the construction of a yoke member.
Figure 4A:
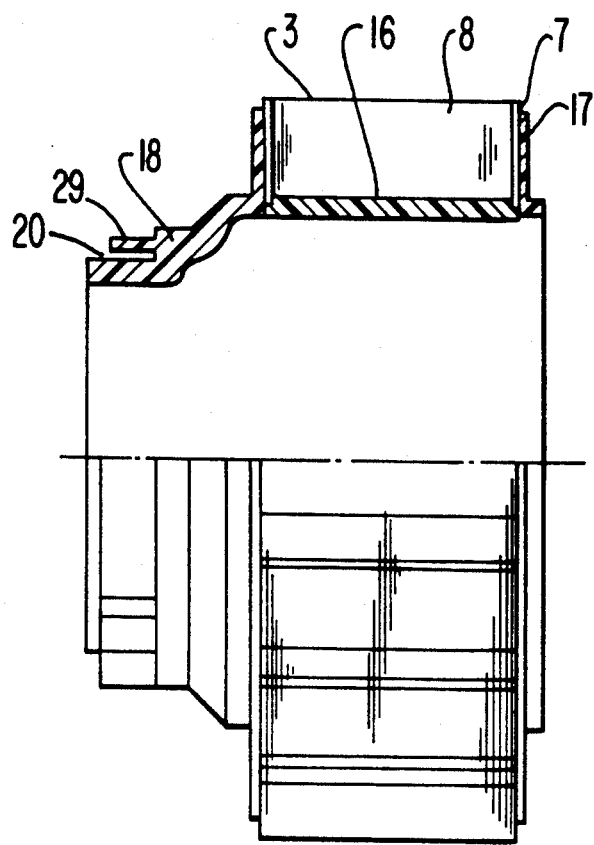
FIG. 4(a) is a partial cross-section view showing a resin shroud molded around the magnetic pole member and FIG. 4(b) is a perspective view of the same.
Figure 4B:
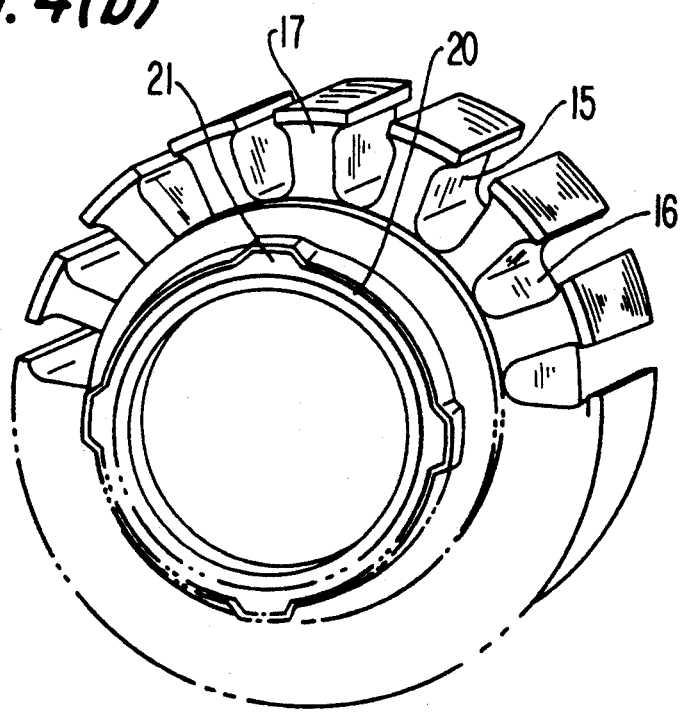

The yoke member 2, as shown in FIG. 3, is a core 11 in the shape of a ring with radially inwardly extending projections 14 provided with notches 13 on the inner ends and which are adapted to fit into the slots 12 between poles 4 and between poles 4' of the magnetic pole member 3 and has the same thickness as the magnetic pole member 3 and is secured in position around the pole member 3. The thus laminated and secured magnetic pole member 3 is clad by molding an electrically insulating synthetic resin (hereinafter referred to as resin) such as polyethylene terephthalate or polybutylene terephthalate therearound to form insulating layers in the slots 15 and at 16 at the inner edges of assemblies 8 and the windings at 17 at both ends of the pole member 3 and strengthen the bond between units 7 and assemblies 8. Furthermore, a generally cylindrical shroud 18 is simultaneously molded at one end face of the magnetic pole member 3. This shroud 18 is shaped in a generally cylindrical form which is slightly longer than the extension of the coil ends of the winding. The inner diameter of one portion is equal to the inner diameter of the magnetic pole member 3 and the corresponding outer diameter is equal to that of the slot region 16, while the inner diameter and outer diameter of the other portion are relatively smaller and, as shown in FIG.

Figure 5:
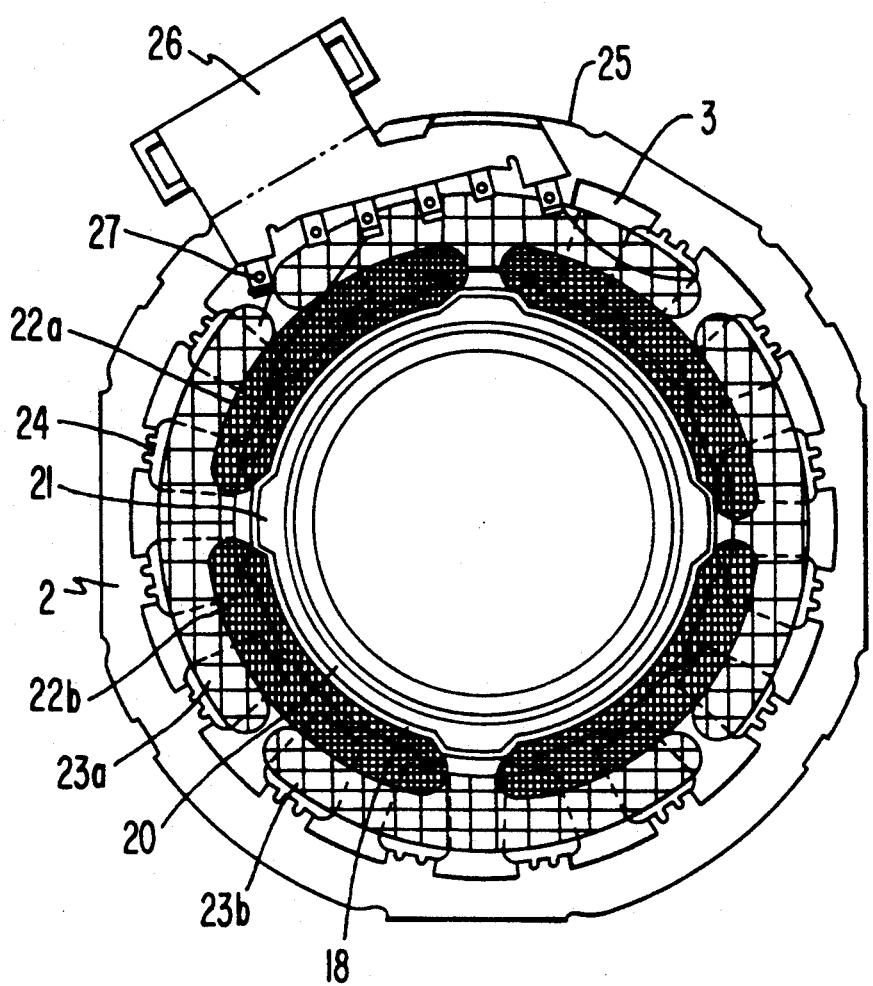
FIG. 5 is a diagrammatic view of the stator having the windings thereon as viewed from the coil end.

4(b), the forward end face has a ring-shaped groove 20 therein with a plurality of radially outwardly extending pocket-shaped portions 21. As shown in FIG. 5, each of the pocket-shaped portions 21 is disposed in a position between windings 22a and 22b where the magnetic pole is situated so as to avoid interference of coil end 19a.

The magnetic pole member 3 insulated and provided with the shroud 18 by resin molding is provided with windings 22a and 22b, and 23a and 23b in such a manner that the coil end 19a will fit the shroud 18 as shown in FIG. 5, and after insertion of wedges 24, the yoke core 2 is press-fitted to the outer periphery of the magnetic pole member 3 to form a stator 25. Disposed on an axial end face of the stator 25 is a connector 26 and the ends of said windings are connected to connector terminals 27 thereof, respectively.

Figure 6:
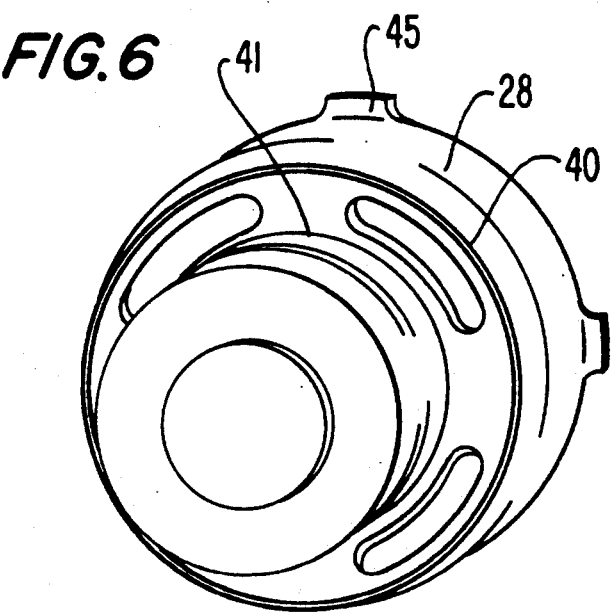
FIG. 6 is a perspective view of a bracket.
Figure 7:
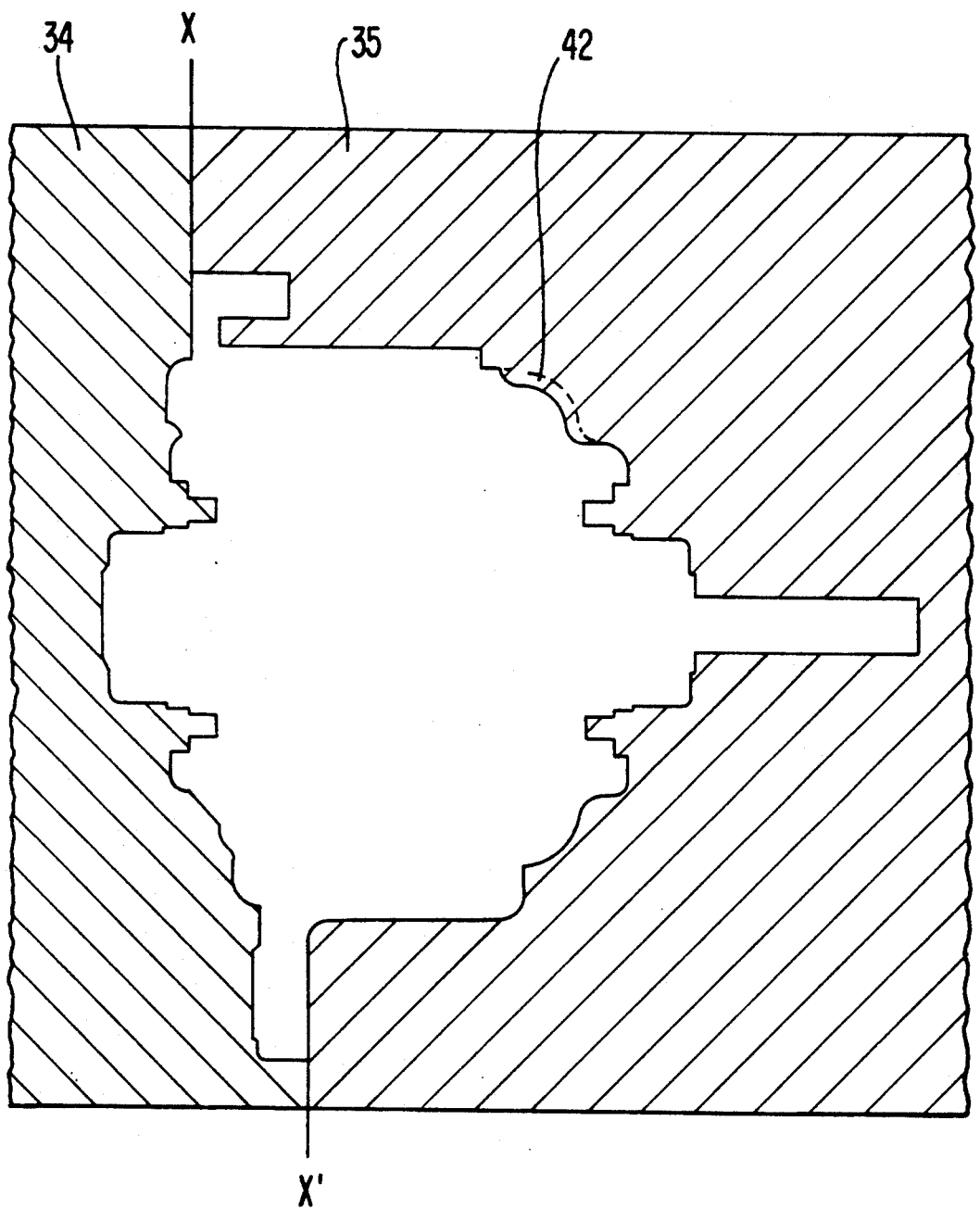
FIG. 7 is a cross-section view of the metal mold used for molding the frame.

Fitted into the ring-shaped groove 20 of shroud 18 of the thus constructed stator 25 is a bracket 28 of sheet steel as shown in FIG. 6. This bracket 28 is provided with projections 45 along its edge for fitting into said pocket-shaped grooves 21 and preventing slip-out and movement in the direction of rotation after molding.

Furthermore, a wall portion 29 external of said ring-shaped groove 20 and pocket-shaped grooves 21 insures insulation from coil end 19a.

Then the rotor 9 in inserted into the internal bore of the stator 25 and a first bearing 30a is supported by a journal means 31 in the bracket 28. Then a shroud 32 molded from resin in the same shape as shroud 18 is juxtaposed with the other end face of the magnetic pole member 3 and a bracket 33 is fitted to the end thereof just as the bracket 28 and a second bearing 30b of the rotor 9 is supported thereby. Then the coil end 19b is trimmed to insure intimate contact with the shroud 32.

Figure 1:
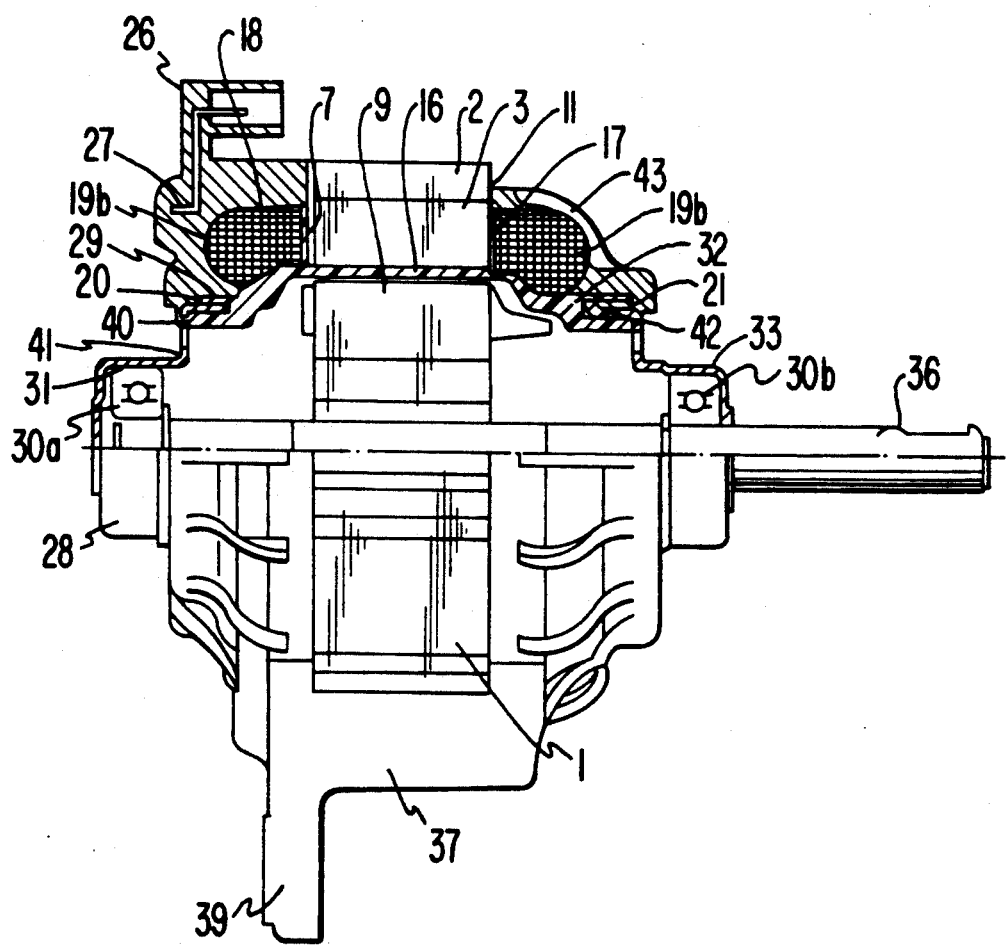
FIG. 1 is a partial cross-section view showing the construction of a resin-molded motor embodying the principle of the invention.

The finishing process for the thus constructed resin-molded motor is described below. The above-described stator 1, brackets 28 and 33, connector 26 and rotor shaft 36 are set in a metal mold 34, 35 having a parting plane X-X' and the resin material is poured in to mold a casing 37 and a flange 39, whereby the resin-molded motor shown in FIG. 1 is obtained.

In order that the resin will not flow into the rotor space or other unwanted parts during the molding process, the end faces of brackets 28 and 33 are respectively formed with ring-shaped projections to press against the mold components 34 and 35 and thereby fine-adjust the pressure in the pressing direction on the respective component members. The brackets 28 and 33 are provided with spigot means 41 for ease of setting in the mold and equalizing the air gap for the rotor 9 and stator 25. This is to absorb any dimensional error of the inner and outer diameters of the journal means 31 in the press forming of brackets 28 and 33 and the journal means 31 is thereby assured of having an accurate inner diameter. With this dimension as a reference, the spigot portion 41 is processed to ensure accuracy of the outer diameter to align the center of the bearing with the mold center. Furthermore, the metal mold components 34 and 35 are provided with a plurality of blades 42 adapted to abut the coil ends 19a and 19b so as to prevent exposure of coils through the resin on the surface of the casing caused by the shift or deformation of coil ends 19a and 19b due to the molding pressure. During molding, the blades form ventilation orifices 43 to enhance the dissipation of heat from the windings 22 and 23.

The niches or grooves 13 formed in the projections 24 of the yoke member 2 provide for local flows of resin to assure a smoother resin flow around the wedges 24 and relieve the axial pressure on the wedges to prevent dislocation of the wedges 24.

Thus, the bridge-free magnetic pole member according to the invention assures tougher lamination and bonding and facilitates the fitting of the yoke and enables the provision of a resin-molded motor free of noise and vibration and having improved output characteristics.

Furthermore, the tapered shrouds not only prevent expansion of the coil end toward the outer diameter and reduce the winding material requirements but help reduce the diameter of the stator and the overall size of the resin-molded motor.

In addition, the blades at the coil end region of the metal mold reduce the incidence of rejects due to exposure of the coil on the surface and the ventilation orifices formed thereby contribute to enhanced heat dissipation from the windings.

Furthermore, because the connector fitting plane is disposed in the axial direction, the entry of water and water droplets is prevented when the motor is used with the shaft down, in a washing machine, for instance.

We claim:

1. A resin molded motor comprising:
    a rotor;
    a laminated stator having generally axially and radially extending slots defining pole pieces therebetween and resin material molded in the inner portions of the slots and over the inner ends of the slots for insulation and bonding of the laminated stator;
    a generally cylindrical resin material shroud at each end of said stator extending from the corresponding axial end face at the inner peripheral portion thereof and extending axially of the motor;
    a steel sheet bracket on the axially outer end of each of said shrouds, each said steel sheet bracket having a means for preventing resin from flowing into an inner peripheral portion of said stator during molding, said means comprising a ring-shaped projection on an outer surface thereof for pressing against a mold component and a portion thereof pressing against a said shroud, and having journal means therein supporting said rotor;
    a plurality of windings around the pole pieces of said stator and having axially outer coil ends against said shrouds;
    a connector having connector terminals to which conductor ends of said windings are connected for supplying power to said windings; and
    a housing of resin material molded around said stator, said windings, said shrouds, said brackets and said connector with said terminals exposed from said housing.

2. A resin molded motor comprising:
    a rotor;
    a laminated stator having generally axially and radially extending slots defining pole pieces therebetween and resin material molded in the inner portions of the slots and over the inner ends of the slots for insulation and bonding of the laminated stator;
    a generally cylindrical resin material shroud at each end of said stator extending from the corresponding axial end face at the inner peripheral portion thereof and extending axially of the motor;
    a steel sheet bracket on the axially outer end of each of said shrouds and having journal means therein supporting said rotor;

a plurality of windings around the pole pieces of said stator and having axially outer coil ends against said shrouds; a connector having connector terminals to which conductor ends of said windings are connected for supplying power to said windings; and a housing of resin material molded around said stator, said windings, said shrouds, said brackets and said connector with said terminals exposed from said housing;

wherein said stator is comprised of a magnetic pole member having a pair of axially spaced core sheet units each having a plurality of circumferentially spaced radially extending sheet pole pieces and connections connecting the radially inner ends of said sheet pole pieces to form a ring, and further having a plurality of independent radially spaced laminated pole pieces held between and supported by the sheet pole pieces of said core sheet units, and an annular yoke member around said magnetic pole member and engaged with the radially outer ends of said pole pieces, said connections connecting the radially inner ends of said sheet pole pieces to form a ring having axially extending recesses on the inner circumferential surface thereof.

3. A motor as claimed in claim 2 wherein the radially inner ends of the projections on said yoke have radially inwardly extending projections thereon fitted between said laminated pole pieces, and the axially inner ends of said projections have axially extending notches therein.

4. A resin molded motor comprising:
  a rotor;
  a laminated stator having generally axially and radially extending slots defining pole pieces therebetween and resin material molded in the inner portions of the slots and over the inner ends of the slots for insulation and bonding of the laminated stator;

a generally cylindrical resin material shroud at each end of said stator extending from the corresponding axial end face at the inner peripheral portion thereof and extending axially of the motor;

a steel sheet bracket on the axially outer end of each of said shrouds and having journal means therein supporting said rotor;

a plurality of windings around the pole pieces of said stator and having axially outer coil ends against said shrouds;

a connector having connector terminals to which conductor ends of said windings are connected for supplying power to said windings; and a housing of resin material molded around said stator, said windings, said shrouds, said brackets and said connector with said terminals exposed from said housing;

wherein each bracket has a ring-shaped portion projecting axially toward the corresponding shroud and a plurality of radially outwardly extending projections on said ring-shaped portion, and the axially outer end of each of said shrouds has a ring-shaped groove therein into which the axially inwardly facing end of said ring-shaped portion of the corresponding bracket is engaged, and said groove has a plurality of radially outwardly extending pocket-shaped portions spaced at intervals therearound and into which said radially outwardly extending projections are engaged.

5. A motor as claimed in claim 4 wherein each of said pocket-shaped recesses is positioned between adjacent windings.

* * * * *